Oct. 27, 1953                J. N. PAUL                2,657,375
                          SIGNAL CONTROL SYSTEM
Filed June 7, 1950                                10 Sheets-Sheet 5

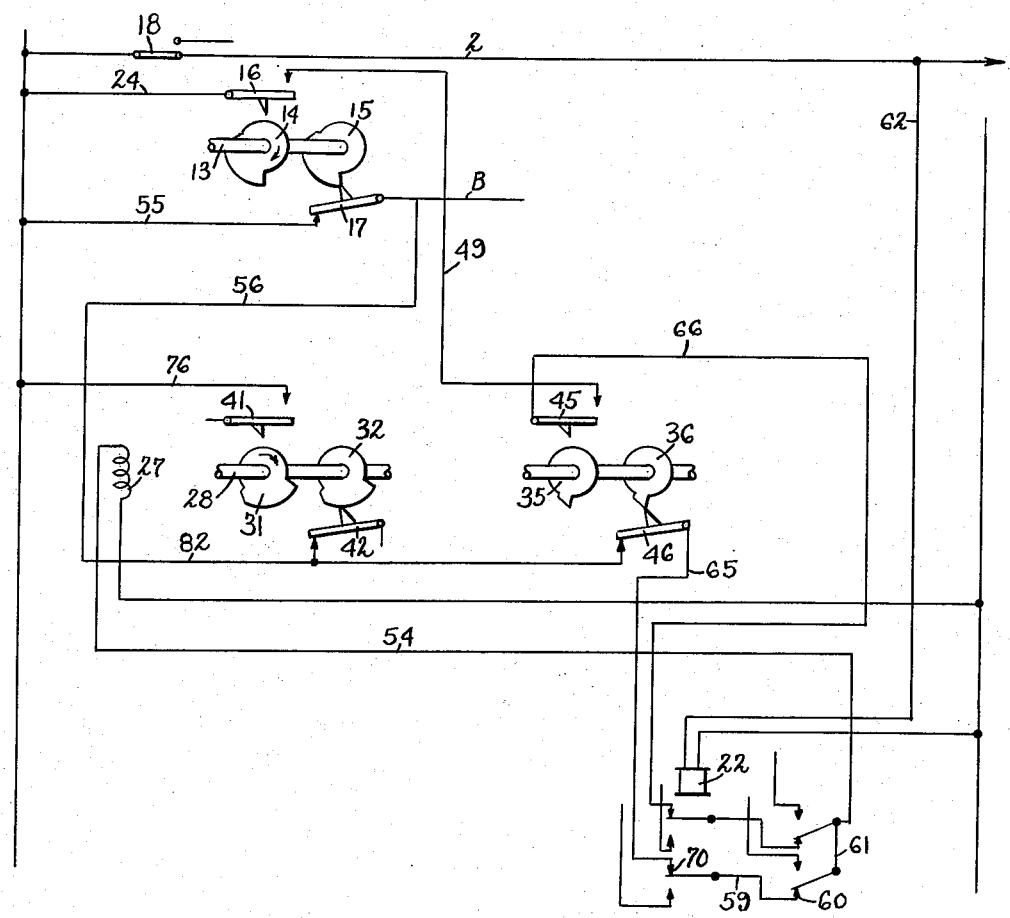

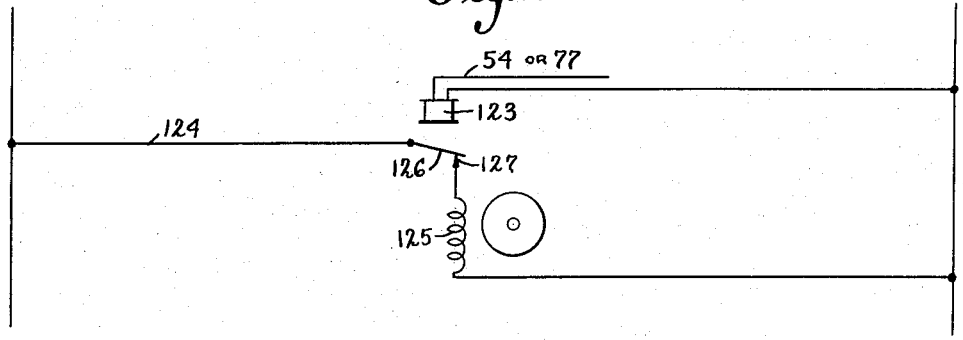
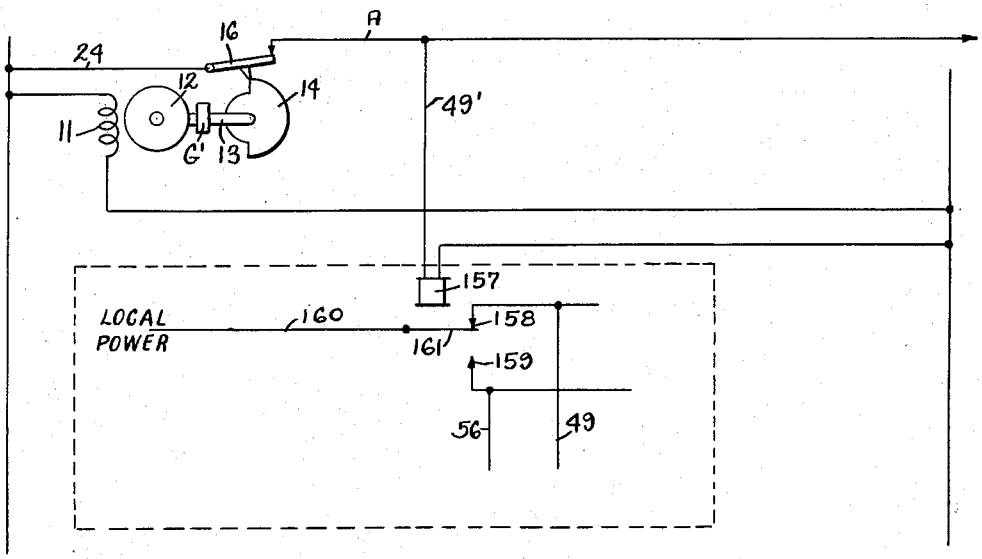

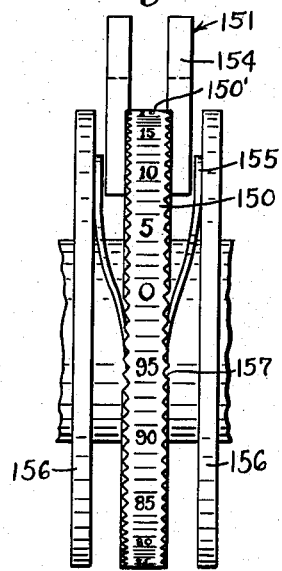
Fig. 4.
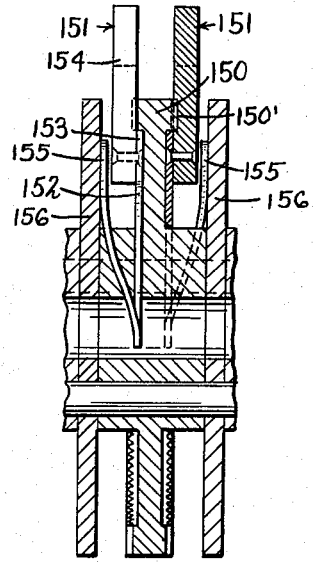
Fig. 4.ᴬ
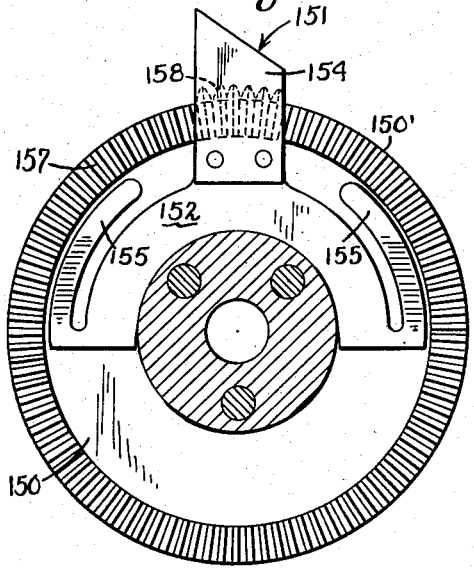
Fig. 5.
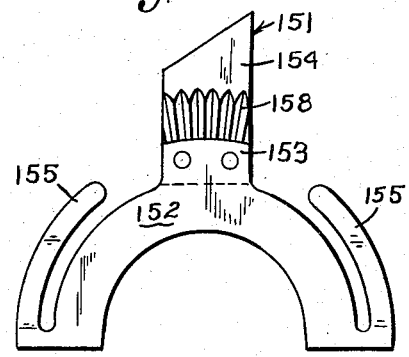
Fig. 6.

CYCLE OF FIG. 7 EXPANDED 20% BY UNIFORM PERCENTAGE INCREASE IN ALL INTERVALS AND OFFSETS. NORTHBOUND AND SOUTHBOUND TRAFFIC BANDS EACH WIDENED TO 20 SECONDS. SPEED DECREASED TO 20.8 M.P.H.

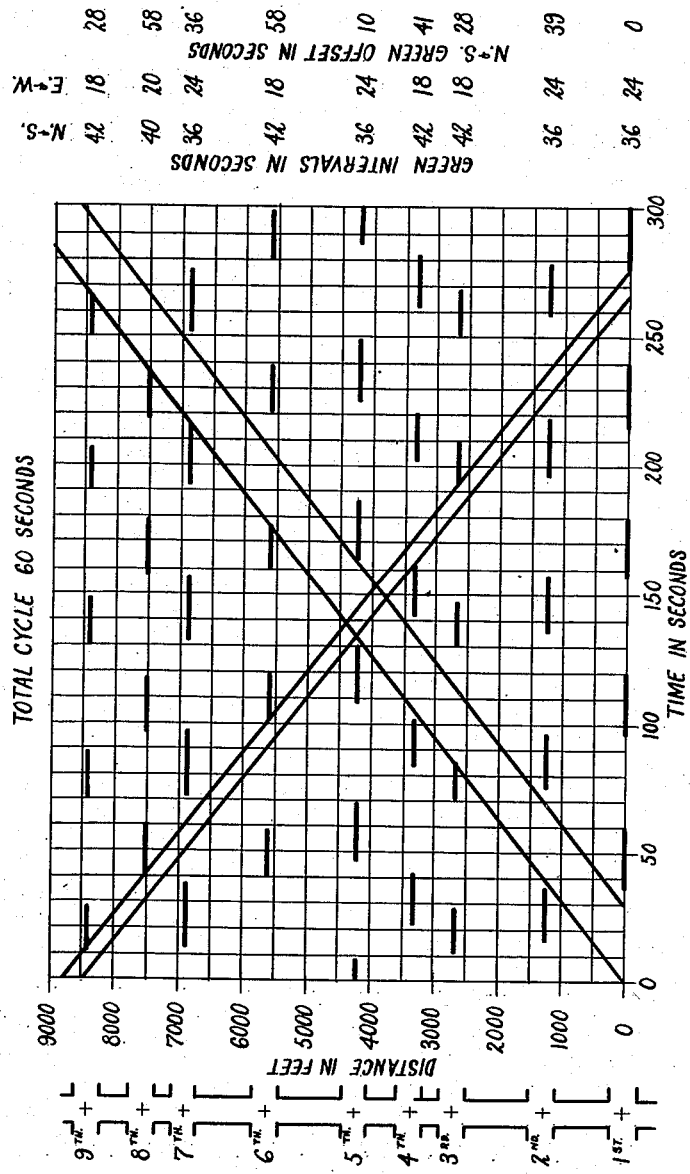
Fig. 11. CYCLE OF FIG. 10 EXPANDED 20% TO 60 SECONDS. ALL INTERVALS AND OFFSETS PROPORTIONALLY INCREASED BY 20 SECONDS. NORTHBOUND TRAFFIC BAND WIDENED TO 30 SECONDS. SPEED 20.8 M.P.H.

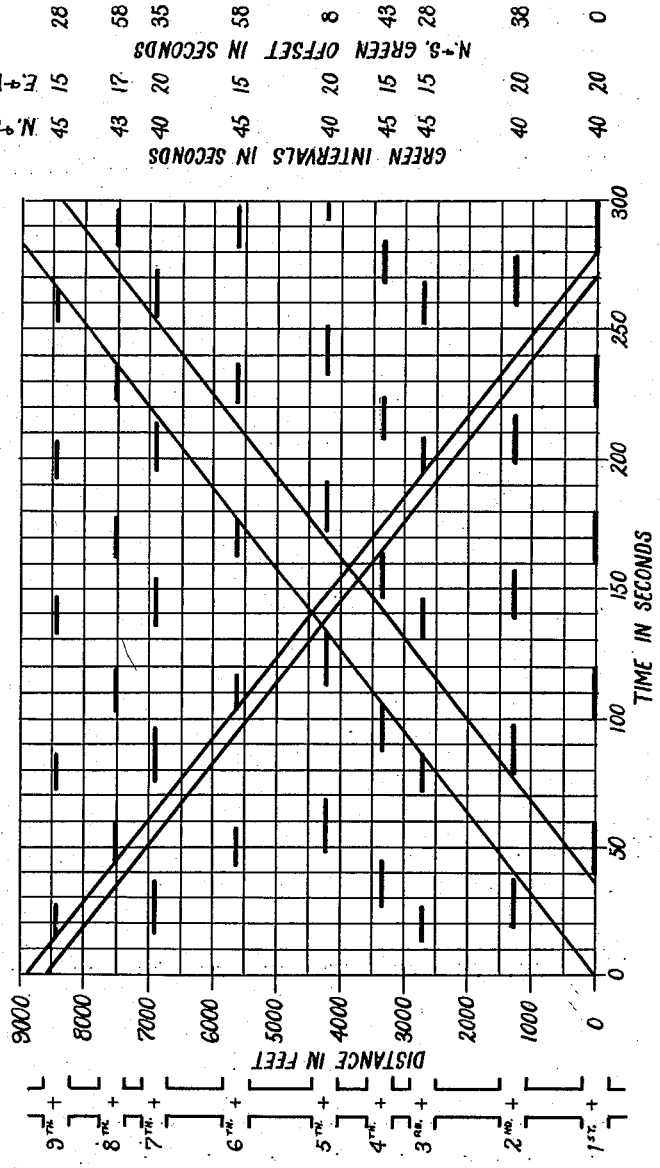

Patented Oct. 27, 1953

2,657,375

UNITED STATES PATENT OFFICE 2,657,375

SIGNAL CONTROL SYSTEM

Joseph N. Paul, Norwalk, Conn.

Application June 7, 1950, Serial No. 166,648

21 Claims. (Cl. 340—40)

This invention relates in general to improvements in electrical circuits and devices for controlling signalling apparatus, and especially for controlling a plurality of signals arranged in a coordinated group or system. A common example of such a group is a series of signals along a traffic artery leading from a residential to a business district. Another example is a district in which a group of parallel streets running north and south is crossed by streets running east and west, where it is desirable to coordinate traffic flow in the entire district.

Traffic moves most efficiently in what is known as a progressive system, and in setting up such a system provision must be made for dividing the time at each intersection in a manner best to accommodate the traffic, and provision must also be made for setting the relative timing or offsets of the green indications. Progressive systers are in common use, and some of these provide a selection of offsets to adapt the apparatus to changes in traffic, and some provide a limited selection of timing divisions or splits, and some provide means for changing the total cycle length, these adjustments or manipulations being possible by remote control from a central station. However, so far as I am aware, systems known up to this time contain inherent limitations in flexibility and ranges of adjustment, and require complicated and unreliable apparatus which is expensive to manufacture and maintain. Except for relatively few installations of limited size, these limitations and drawbacks have prevented previous systems from being placed in use.

One of the objects of the present invention is to provide apparatus whereby these limitations and drawbacks are overcome.

Another object is to provide improved apparatus for a progressive system of traffic control, which provides remote control of (1) offset settings, (2) cycle division or split, and (3) cycle length.

Another object is to provide remote control of cycle length or total period, and in so doing provide for the distribution of the time change in the most desirable manner, and, more specifically, in the green intervals.

A further object is to provide a system in which offsets may be set at any desired time without interfering with amber or other change intervals.

Another purpose of the invention is to provide improved means for enlarging or expanding the cycle time and resetting the offsets in a manner most appropriate to such expansion.

Another feature contemplated by the invention is the provision of cycle expansion over a continuous range rather than by a series of steps.

A further object is to obviate the need of voltage adjustment in the drive of control motors, and to eliminate the use of clutches or other devices subject to excessive wear.

Further objects will be pointed out or will become apparent as the description proceeds.

In the accompanying drawings:

Fig. 2 is a diagram showing in another position or adjustment certain parts appearing in Fig. 1;

Fig. 3 is a detail illustrating a modification hereinafter mentioned;

Fig. 3A is a diagram showing a further modification;

Fig. 4 is an edge view showing a cam with removable lobes;

Fig. 4A is a detail sectional view;

Fig. 5 is a face view of the cam shown in Fig. 4;

Fig. 6 is a detail of the cam lobe showing it removed from the cam body; and

Figs. 7, 8, 9, 10, 11 and 12 are explanatory charts to which reference will be made hereinafter.

Figure 1:
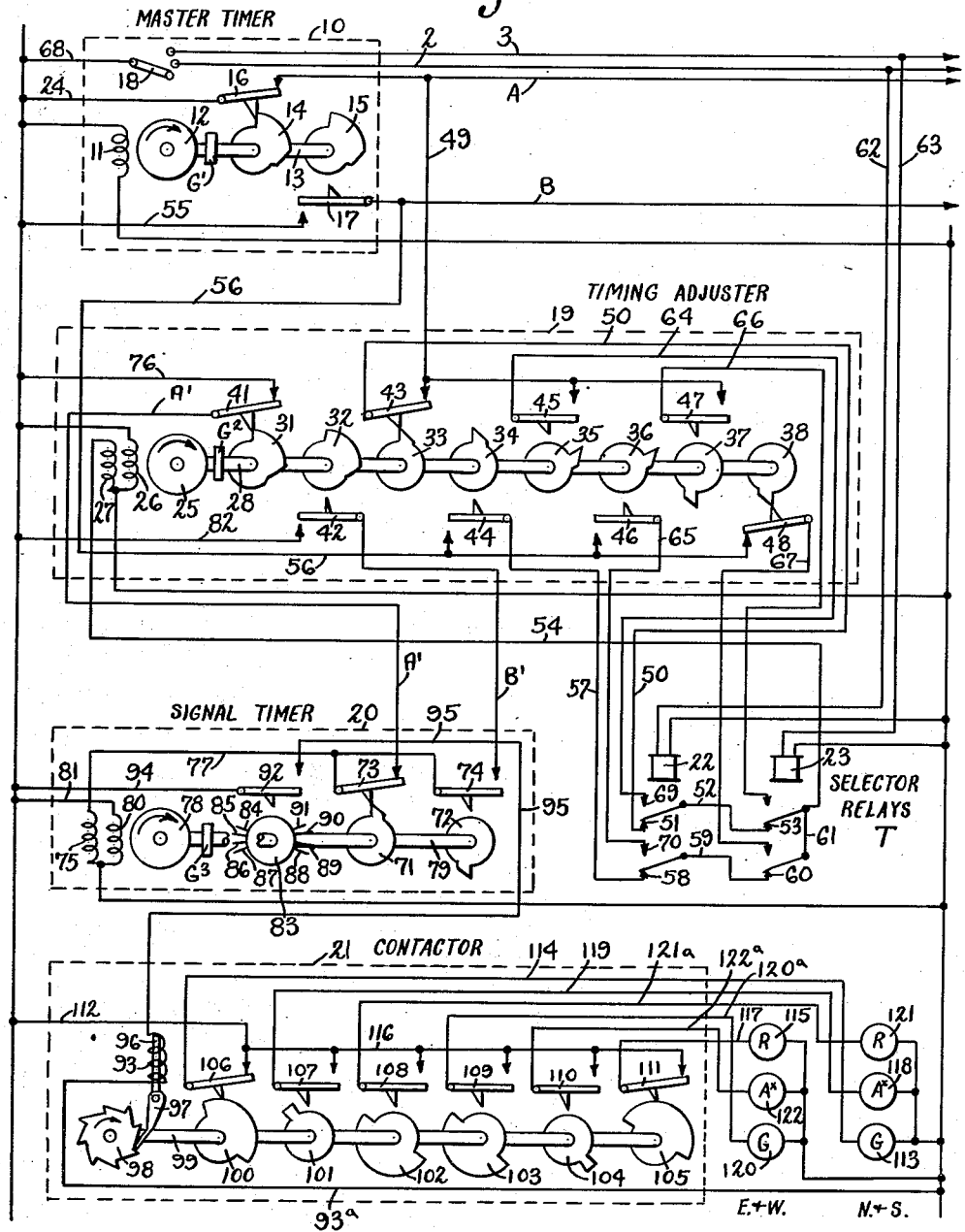
Fig. 1 is a diagram showing a form of control apparatus embodying the invention.

In disclosing the invention the diagram of Fig. 1 has been prepared in an across-the-line form. In the new system a master timer is employed, and this is usually located at a central station. At the street intersections which are signalized, there are placed the devices hereinafter described, controlled from the master timer. In the case illustrated, the apparatus hereinafter described, including the timing adjuster, signal timer, selector relays, and contactor, are assumed to be placed near the respective street intersections. In this across-the-line diagram also there are shown, in addition to the connections from the master timer to the local apparatus, circuit lines continued from the master timer which can be connected to control signal-timing means located respectively at any number of additional intersections, this timing apparatus being of the kind shown in Fig. 1.

In Fig. 1 the main lines of the power circuit are at the respective sides of the diaphragm, with the master timer and its control apparatus at one station arranged across the circuit. At the upper part of the diagram is the master timer 10, and below this the timing adjuster 19; below the timing adjuster are the signal timer 20 and the selector relays T; and below the last-mentioned elements is the contactor 21 which controls the operation of the signal lights at the local station.

The master timer 10 supplies energy to two circuits comprising the leads A and B having taps, later referred to, that are connected to the timing adjuster 19. In connection with the master timer also there is a switch, hereinafter described, adapted to transfer energy to offset lines 2 and 3, from which connections, hereinafter described, go to the selector relays T and like selector relays of other local stations.

Referring now to the details, and more particularly those of the master timer 10, it will be noted that the master timer comprises a motor having a rotor 12 and a field 11, rotor 12 being connected by the usual gearing, conventionally illustrated at G', permitting adjustment of the rate of drive, to a shaft 13 on which are placed cams 14 and 15. The cams 14 and 15 respectively actuate switches 16 and 17, these switches being connected to the respective circuit lines or first supervisory circuits A and B. Switch 16 when closed is adapted to connect circuit lead A with the left-hand main power line through a connection 24, and similarly switch 17 when closed is adapted to connect circuit lead B to said power line through a connection 55. The switches 16 and 17 are assumed to be spring-pressed switches pressed by their springs toward the respective cams and spring-held against the cam lobes. In this instance the cam 14 has a lobe, extending through 25% of its periphery, which holds the switch 16 closed during a quarter revolution of the shaft 13, the switch being open through the remainder of the revolution. The cam 15 and switch 17 have a similar arrangement with respect to each other, but, as will be observed from the drawing, the arrangement is such that the cams close the switches alternately, each switch being closed at a diametrically opposite point in the shaft revolution with respect to the other switch. In the case shown the cams 14 and 15 are in the same angular position on the cam shaft and switches 16 and 17 are placed diametrically opposite with respect to the angular position of the cam shaft. Rotation of cam shaft 13 is uniform and continuous, it being assumed in this particular case that the motor is a synchronous motor, and the master timer performs the function of energizing circuits A and B alternately, each for a definite period of approximately 25% of each revolution.

As a part of the master timer apparatus at the central station, a switch 18 is employed, which is shown in Fig. 1 as being in the open position. The switch 18 is connected to the left-hand main power line by means of a lead 68, and is adapted to connect this power line with the offset circuit line 2, or with the offset circuit line 3, for purposes which will hereinafter appear.

The timing adjustor 19 comprises a motor, assumed to be a synchronous motor, having a rotor 25 driving by gearing conventionally shown at G² a cam shaft 28 upon which are mounted a plurality of pairs of cams which are adapted to operate switches for changing the circuit connections. In this particular case there are four pairs of cams, making eight in all. The cams of a pair are similarly set upon the cam shaft, whereas the switches co-acting with the cams of a pair are diametrically arranged. Two of these cams, 31 and 32, are similar to the cams 14 and 15, and with these respective cams 31 and 32 switches 41 and 42 cooperate, these switches being similar to the switches 16 and 17. In other words, cams 31 and 32 close the switches during a quarter of a revolution of the shaft, and let the switches remain open during the remainder of the revolution, as explained above in connection with the master timer. Three other pairs of cams are also placed upon the shaft 28, in this particular instance cams 33 and 34 constituting the first pair, 35 and 36 the second pair, and 37 and 38 the third pair. The switches 43, 44, 45, 46, 47 and 48 co-act with the respective cams 33, 34, 35, 36, 37 and 38. The cams of this last-mentioned group have relatively narrow lobes which are sharply sloped as distinguished from the cams 14, 15, 31, 32, which have longer and curving surfaces on their lobes.

Preferably the narrow-lobed cams have lobes that are angularly adjustable with respect to the cam shaft 28, and are also removable when desired. For this purpose a structure such as shown in Figs. 4, 4ᴬ, 5 and 6 can be employed. Here a cam body 150 of round disk shape may be suitably locked to the cam shaft, and adjustable and removable cam lobes 151 may be employed in association with the cam body at the respective faces so as to have a projecting relationship to the body. At each face of the cam body the peripheral part is raised somewhat from the face of the body, as shown at 150', and is grooved radially so as to provide, preferably, one hundred radial grooves. The cam lobe 151 is preferably made in two parts, one of said parts being a spring-equipped yoke 152 having a part 153 to which a projecting lobe section 154 is attached in a suitable manner. The yoke 152 is provided adjacent the respective ends with projecting spring arms 155 arranged at an angle to the body of the yoke, as shown in Fig. 4, and adapted to press at their ends against plain disks 156 fixed in an appropriate manner to the shaft and spaced somewhat from the respective sides of the cam body 150. The cam lobe 151 is provided at that face opposing the cam body with several radial grooves 158 adapted to be engaged by certain ribs 157 presented by the herein-described grooving of the cam body, and the action of the springs 155 is such as to hold the lobe firmly against angular displacement from the position to which it is adjusted. The yoke of the cam lobe is arranged to straddle the shaft in the manner shown, and to permit the removal of the cam lobe from the cam body in a convenient manner when this is desired. For the purpose of removal, it is merely necessary to press with the fingers laterally against the lobe and then lift the lobe in a radial direction. The manner of reassembling the lobe with the cam body will be obvious from the foregoing description.

For the purpose of facilitating the adjustment of the cam lobe to the desired extent, the peripheral surface of the cam body may be provided with a scale, which, in the case shown, divides the surface into one hundred equal parts, said scale having numerals associated therewith. By this arrangement the lobe can be adjusted angularly by increments of one percent.

Returning now the description of the timing adjuster 19, it is to be noted that the rotor 25 has a drive coil 26, and a second coil 27 which when energized counteracts the effect of coil 26 and acts as a brake to stop the motor. The connection of the coil 26 across the main circuit lines is shown in the drawing, and it is noted that the brake coil 27 is connected at one point to coil 26 and at another point to a lead 54 which goes to one of the selector relays T. A connection 76 is made to the switch 41 from the left-hand main circuit line, and from the swinging axis of switch 41 a circuit lead or secondary supervisory circuit A' goes to the signal timer 20 for a purpose hereinafter described. Similarly a lead 82 goes to the switch 42 from the left-hand main circuit line, and the pivot of switch 42 is connected by a lead or secondary supervisory circuit B' with the signal timer 20 for a purpose hereinafter described. From the lead B a connecting leg 56 goes to the switches 44, 46 and 48, and from lead A a leg 49 goes to switches 43, 45 and 47, while a line 50 goes from switch 43 to one of the selector relays. There are two selector relays having respective coils 22 and 23, relay coil 22 being connected to offset circuit 2 by lead 62, and relay coil 23 being connected to offset circuit 3 by lead 63, and the two relay coils being connected to the right-hand main circuit line. Switch 46 has a connection 65 used in association with the relay coil 22, as hereinafter described, and switch 48 has a connection 67 used in association with relay coil 23, as hereinafter described.

Referring now to the signal timer 20, this device has a motor which may be a synchronous motor provided with a rotor 79, a drive coil 80 and a brake coil 75, drive coil 80 being connected across the circuit by means including a lead 81 and brake coil 75 being connected by a connection 77 to the pivoted ends of switches 73, 74 that are similar to the switches hereinbefore described. The opposite end of switch 73 is adapted to be connected to line A' by a cam 71 on drive shaft 79, and the free end of switch 74 is adapted to be connected to the circuit line B' by cam 72 on drive shaft 79. Drive shaft 79 is connected to motor 78 by gearing conventionally shown at $G^3$. Also mounted on the drive shaft 79 is a dial 83 provided with a number of keys, the dial and its keys being of a suitable type for cooperation with a switch 92 connected by lead 94 to the left-hand main circuit line, switch 92 when closed establishing connection with a lead 95 which goes to the contactor 21. The key-equipped dial 83, may, if desired, be of the kind shown in patent to Reid No. 2,236,297, dated March 25, 1941, although I do not limit myself in this respect. The keys are adapted to be inserted in radial slots in the dial, there being one hundred radial key positions equally spaced around the dial. In the present case keys 84, 85, 86, 87, 88, 89, 90 and 91 are arranged to close switch 92, each closing it for a short time, usually about one percent of a dial revolution.

The contactor 21 is provided with a rotating cam shaft 99 connected to an actuating ratchet wheel 98 adapted to be turned in the direction indicated by the arrow by a pawl 97, which pawl is pivotally connected to the core 96 of a solenoid having a coil 93. The coil 93 is connected to the lead 95, previously mentioned, and to a lead 93ᵃ that extends over to the right-hand main circuit line. Fixed on the cam shaft 99 in this particular case are six cams 100, 101, 102, 103, 104 and 105 that respectively actuate switches 106, 107, 108, 109, 110 and 111. The cams referred to have switch-actuating lobes with curved peripheries, the lobes of cams 100, 102, 103 and 105 being wide and the lobes of cams 101 and 104 being narrow. These cams may be initially in the form of round frangible disks provided with weakened lines facilitating the breaking off of a part of the cam circumference, as shown in the Reid patent 2,236,297, previously mentiond. A connecting lead 112 goes from the left-hand main circuit line to a circuit leg 116 that has fixed contacts adapted to cooperate with the switches 106, 107, 108, 109, 110 and 111. From the pivoted end of the switch 106 a circuit leg 114 goes to the green light 113 of the North and South group, marked N & S, which light is connected to the right-hand circuit line. From the pivoted end of the switch 107 a leg 119 goes to the amber light 118 of the N & S group. From the pivoted end of the switch 108 a lead 121ᵃ goes to the red light 121 of the N & S group. From the pivoted end of the switch 109 a lead 120ᵃ goes to the green light 120 of the E & W group. Switch 110 is connected by lead 122ᵃ to the amber light 122 of the E & W group, and switch 111 is similarly connected by lead 117 to the red light 115 of the E & W group.

Let is be assumed that cam shafts 13 and 28 are in the positions shown, with cam 14 just at the point of opening switch 16, and cam 33 just at the pont of opening switch 43. With switch 16 closed, line A will be energized through lead 24 and switch 16, and energy will reach brake coil 27 through lead or tap 49, switch 43, lead 50, contact 51 (associated with selector relay coil 22), jumper 52, contact 53, and lead 54. When brake coil 27 is energized, cam shaft 28 is stopped. Cam shaft 13 is, however, rotating continuously, and will immediately permit switch 16 to open, which will break the circuit just described as energizing brake 27 and release rotor 25, allowing cam shaft 28 to rotate and immediately open switch 43.

Cam shaft 28 is geared by gearing $G^2$ to run faster than cam shaft 13. Assume an average working condition where cam shaft 13 of the master timer runs at the rate of one turn in fifty (50) seconds, and cam shaft 28 is geared to run at the rate of one turn in forty (40) seconds. Following common practice, let it be assumed that the time at which cam 14 opens switch 16 is zero time. Cam 15 will then close switch 17 at twelve and a half (12.5) seconds, and cam 34 will close switch 44 at twenty (20) seconds. When switch 17 closes, line B will be energized, and when switch 44 closes, a circuit to brake coil 27 will be completed through lead 55, switch 17, line B, tap 56, switch 44, lead 57, contact 58, jumper 59, contact 60, jumper 61, and lead 54. This will hold cam shaft 28 until switch 17 is opened by cam 15 at twenty-five (25) seconds after assumed zero time. When cam shaft 28 is thus released it will rotate a half turn in twenty (20) seconds, whereupon cam 33 will close switch 43. During this time cam 14 will have closed switch 16, so the circuit through 24, 16, A, 49, 43, 50, 51, 52, 53 and 54 will be closed to brake coil 27. This will hold cam shaft 28 until switch 16 is at the opening point, at which time both cam shafts will again be in their zero-time positions. The resultant action is that cam shaft 28 with two dwell periods of five seconds each makes one revolution in the same time that cam shaft 13 makes one revolution, and, in addition, a definite time relation is maintained.

In the circuit as shown in Fig. 1, switch 18 is open, lines 2 and 3 are de-energized, and relay coils 22 and 23 receive no energy through taps 62 and 63. Leads 64, 65, 66 and 67 under the conditions shown run to open relay contacts, and therefore the operation of these switches by their associated cams is electrically ineffective. Assume now that switch 18 is thrown to its central position for energizing relay coil 22 through lead 66, switch 18, line 2, and tap 62.

The contacts 51 and 58 will be opened and the contacts 69 and 70 closed. This operation electrically replaces switches 43 and 44 with switches 45 and 46, respectively. Switch 18 may be thrown (either by hand or by automatic time clock) at any time with respect to the positions of the cam shafts 13 and 28. Assuming that it is thrown with these cam shafts in the positions shown in Fig. 1, cam 14 is in position immediately to open switch 16. Switches 45 and 46 are open, and switches 43, 44, 47 and 48 are electrically ineffective, as explained above, so no circuit is complete to brake coil 27, which leaves cam shaft 28 free to rotate. Cams 35 and 36 are angularly displaced with respect to cams 31 and 32 an amount which can be assumed to be 20% of a turn, or 72°. Cam 36 will close switch 45 after an angular movement of 108°, and cam 15, after a 90° movement, will have closed switch 17 and will hold it closed for the next 90° movement. Switch 17 will, therefore, be closed at the time switch 46 closes. This will complete a circuit to brake coil 27 through lead 55, switch 17, line B, tap 56, switch 46, lead 65, contact 70, jumper 59, contact 60, jumper 61, and lead 54. This will stop cam shaft 28 until cam 15 opens switch 17 at half a revolution, i. e., half a cycle, after the originally assumed zero time. The positions of all effective cams and contacts at this half-cycle release point are shown in Fig. 2.

It will be noted from Fig. 2 that the operating positions of cams 31 and 32 of the timing adjuster are retarded with respect to zero time by the amount that the positions of cams 35 and 36 are relatively advanced with respect to cams 31 and 32. An important function of the timing adjuster is to retard cams 31 and 32 any desired amount with respect to the master timer cams 14 and 15, in other words, to retard cams 31 and 32 with respect to zero time. The amount of this retarding action is usually expressed in percent of signal cycle past assumed zero time, and the percentage in the particular example here given is 20%.

If switch 18 is thrown to connect line 3, relay coil 22 will be de-energized and relay coil 23 will be energized. This will electrically substitute switches 47 and 48 in the circuits described, and offset the timing adjuster 50%, in accordance with the positions in which cams 37 and 38 are placed in this example. Switch 18 can be thrown into any one of its three positions, thereby selecting any one of three offsets. Each offset is controlled by cams which can be adjusted to give any desired offset. The offset cams are preferably of the type having adjustable and removable lobes as described above, but other kinds of cams can be used which can be adjusted to give the desired offsets. Moreover, it is to be understood that the system is not limited to the employment of three offsets, for additional positions of switch 18 can be provided in connection with corresponding selector relays and additional switches and actuating cams. In the case shown, the offset controlled by cams 33 and 34 can be referred to as the first offset, that controlled by cams 35 and 36 as the second offset, and that controlled by cams 37 and 38 as the third offset.

In the assumed example of transfer from the first offset to the second, the assumed cam positions were such that cam 36 closed switch 45 while switch 17 was closed by cam 15. If the switch 18 is thrown to transfer from an offset with cams set as shown in the first offset, to an offset with cams set as shown for the third offset, cam 37 would then close contact 47 in twenty (20) seconds, but at that time switch 16 would be open so no circuit would be completed to brake coil 27. Cam shaft 28 would, therefore, not stop. As cam shaft 28 is geared for a higher speed than cam shaft 13, it would require relatively few turns before switch 47 closed while switch 16 was closed, or switch 48 closed while switch 17 was closed. When either of these conditions was reached, cam shaft 28 would be stopped and released at the time of the desired offset relation, after which it would maintain this relation, i. e., remain in step.

This inherent characteristic of the present system is very valuable. Most systems require auxiliary equipment to prevent excessively long intervals from occurring. In the present system the increase in the length of a signal indication cannot be longer than the time cam 14 or 15 holds its associated switch closed. This time period is normally about twenty-five percent (25%) of the system cycle and can be adjusted to fit local conditions.

It has been explained how the timing adjuster 19 responds to the supervisory circuits controlled by the master timer. The signal timer 20 is controlled by the timing adjuster in the same manner as the timing adjuster is controlled by the master timer. Cams 31 and 32 of the timing adjuster correspond to cams 14 and 15 of the master timer, and through their associated switches cams 31 and 32 energize the second supervisory circuits or leads A' and B' alternately for periods of approximately 25% of a cycle, just as the first supervisory circuits or lines A and B are energized. It is important to note that the times at which A' and B' are energized may be offset any desired amount by adjustment of the timing adjuster cams, and that a selection of timing adjuster cams set at different offsets may be made by remote control from the master timer.

For convenience of explanation, cam 31 is assumed to be just at the point of release of switch 41, and it is assumed that switch 73 is still closed but at the point of release by cam 71. Brake coil 75 will be receiving energy through lead 76, switch 41, lead A', switch 73, and lead 77. This will hold rotor 78 and cam shaft 79 from turning. When switch 41 opens, the holding circuit will be broken and cam shaft 79 will rotate by energy applied to driving coil 80 received through lead 81. It is normal to have cam shaft 79 geared for the same speed as cam shaft 28, and therefore it is assumed that cam shaft 79 is driven at the rate of one revolution in forty (40) seconds. When cam 31 comes to its release position, switch 41 will open. This will break the holding circuit to brake coil 75 and permit cam shaft 79 to rotate. Cams 71 and 72 are arranged at a spacing of 180° with respect to each other, and therefore, at the assumed gear ratio of one turn in forty (40) seconds, cam 72 will make a half turn and close switch 74 in twenty (20) seconds. During this time, cam 32 will have advanced to close switch 42 even if cam shaft 28 may have been stopped for a resetting interval. The lobe of cam 32 in this example holds the switch 42 closed through a quarter revolution of shaft 28; and, therefore, whether or not a stop period of the assumed length of five (5) seconds has been inserted in the movement of cam 32, either before or after it closes switch 42, switch 42 will be in the closed position when switch 74 closes.

This position of cams and associated switches energizes brake coil 75 of the signal timer through lead 82, switch 42, lead B', switch 74, and lead 77, and stops the cam shaft 79 until switch 42 is opened by movement of cam 32. When switch 42 is opened, the circuit to brake coil 75 will be opened and cam shaft 79 will advance and close switch 73 by movement of cam 71. During this time cam 31 will close switch 41, and at the point of release of cam 31 this cycle will be completed to the assumed starting point.

The over-all result so far is that the timing adjuster is kept in step with the master timer, and the signal timer is kept in step with the timing adjuster. The offset of the timing adjuster may be set at any point by the set of adjustable cams and associated relays, and the offsets are selectable by remote control. The signal timer, on the other hand, is controlled by the timing adjuster and responds to all changes in the timing adjuster and keeps in step in the desired time relation.

I refer now to the control of the contactor 21 from the signal timer 20. When switch 92 is closed, energy is supplied to solenoid coil 93 through lead 94, switch 92, and lead 95. When solenoid coil 93 is energized, the plunger or core 96 is raised, thus raising pawl 97. When switch 92 is opened, solenoid coil 93 is de-energized, and this allows plunger 96 to drop, thereby pushing downward on ratchet 98 and advancing it one tooth, thus turning cam shaft 99 to a corresponding extent and shifting its cams.

Assuming cam shafts 79 and 99 to be in the positions shown in Fig. 1, cam 71 is in position to release switch 73 when switch 41 opens. Switch 106 is closed by cam 100, completing the circuit to the green N & S light 113 through lead 112, switch 106, and lead 114. The red E & W light 115 is also energized through lead 112, leg or feeder 116, switch 111, and lead 117.

When switch 41 opens, cam shaft 79 will advance, and after a certain time (depending on the key positions) key 84 will act on switch 92 and advance cam shaft 99 one tooth of the ratchet. This will open switch 106 so as to de-energize the N & S green light 113 and energize the amber N & S light 118 through lead 112, feeder 116, switch 107 and lead 119. Switch 111 will remain closed, and therefore E & W red light 115 will continue. Key 85 will next actuate switch 92 and advance cam shaft 99 one ratchet tooth. This will open switches 107 and 111, thus cutting off lights 115 and 118, and closing switches 108, 109 by cams 102, 103, and energizing green E & W light 120 and red N & S light 121.

In the typical signal cycle assumed in this example, there are only four changes of indications, but it is difficult to construct a ratchet drive with only four teeth, and so it is common practice to use a larger number of teeth. In Fig. 1 an eight-tooth ratchet is shown, and the associated cams are so shaped that switch positions do not change during certain tooth advances or positions. Following the actuation of switch 92 by key 85, actuations by keys 86 and 87 take place. These are known as dummy keys, and although each actuation advances cam shaft 99 one ratchet tooth, the cams on said shaft are so shaped that there is no change in signal indications.

Switch 92 is next actuated by key 88. This advances cam shaft 99 one ratchet tooth, which opens switch 109, de-energizing green light 120 and closing switch 110 by cam 104 so as to energize amber light 122. Switch 108 is held closed so red N & S light 121 continues. Switch 92 is next actuated by key 89. This advances cam shaft 99 one ratchet tooth, which opens switches 108 and 110 and de-energizes lights 121 and 122, and energizes green light 113 and red light 115, thus completing the signal-light cycle. Keys 90 and 91 are dummies, like 86 and 87, which each advance the cam shaft one tooth without changing any lights. This completes the cycle of cam shaft 99, bringing it again to the assumed starting position.

In the explanation up to this point, a fifty (50) second signal cycle has been assumed. Assume now that the gearing of the master timer has been changed to rotate cam shaft 13 one revolution in sixty (60) seconds, and that no other changes in adjustment are made. Lines A and B will still be energized alternately for 25% of the cycle, but these periods will be increased from twelve and a half (12.5) to fifteen (15) seconds each, and the starts of these periods will still be a half cycle apart, but the time of the half period will be increased from twenty-five (25) to thirty (30) seconds. As the timing adjuster is released twice during each cycle, the intervals between the release points will each be increased five (5) seconds, the cycle of the timing adjuster being increased to sixty (60) seconds. The gearing of the cam shaft 28 remains unchanged, so the extra time will be added to the stop or dwell periods.

Lines A' and B' will each be energized once a cycle. The endings of these energized periods will be a half cycle, or thirty (30) seconds, apart. The length of these periods may be increased or not, depending upon the position of the offset cams, but it is the endings of these periods that release the signal timer, and therefore the length of time leads A' and B' are energized is of no importance provided it is not too short. The gearing of the timing adjuster and the total angle of the lobes of cams 31 and 32 determine the minimum lengths of the A' and B' energized periods, and these do not change by a cycle change at the master timer.

Lines A' and B' control the signal timer in the same way as lines A and B control the timing adjuster. By an increase in the total cycle, the release times of lines A' and B' are increased in time spacing to thirty (30) seconds. The dial keys of the signal timer are so spaced with respect to cams 71 and 72 that the stop periods come at the centers of the N & S and E & W green indications, so the added time of a cycle increase is added in the centers of the green intervals. By doing this it has been found that offsets are distorted so little that distortion can seldom be detected when timing charts are drawn by the usual methods at scales in general use.

It is important to note that in the use of the previously described apparatus the signal timer is never stopped during an amber period, and therefore the length of an amber period is never extended during a change in offset, or by a change in cycle length at the master timer.

In all of the foregoing description it has been assumed that cams in any pair, such as 33 and 34, 35 and 36, or 37 and 38, were positioned to act at diametrically opposite positions of the cam shaft of the timing adjuster. Assume now that cam 33 is advanced 10% with respect to its position as shown in Fig. 1. This will be an angular advance of 36°, or a time advance of four (4) seconds. This will cause a delay of four (4) seconds in the opening of switch 41, and a consequent delay of four (4) seconds in de-energizing lead A'. This will cause a similar time delay in the release of cam shaft 79 of the signal timer. As this cam shaft is in the position to energize the green N & S light 113, it will cause a four (4) second delay in de-energizing this light. The position of cam 34 remains unchanged, and, as this governs the release of switch 42 by cam 32, there will be no change in the time that cam 72 releases shaft 79. In this position of shaft 79 the green E & W light 120 is energized so there will be no change in the time of de-energizing light 120. An amber period of unchanged length follows the de-energizing of light 120, and then the green N & S light 113 is energized. There will, therefore, be no change in the time of energizing light 113, but there will be a delay of four (4) seconds in de-energizing it. The amber period following the green N & S indication will be delayed four (4) seconds, but its length will remain unchanged. The time of energizing the green E & W light 120 will, therefore, be delayed four (4) seconds. Thus, the over-all effect of displacing cam 33 by 10%, or a four (4) second displacement, is to add four (4) seconds to the green N & S indication and take four (4) seconds from the green E & W indication.

Cam 34 could be similarly displaced instead of cam 33, with the result that the E & W green interval would be increased and the N & S green interval decreased. By unequal spacing of the timing adjuster cams of any pair the time added by an increase of the cycle length may be divided to give any portion or all to either street. It is apparent that the division or split of the time cycle can be changed by the relative settings of the offset cams in any secondary controller. This system provides a selection of pairs of offset cams by remote control, and provides also a selection of cycle splits by remote control. It has been explained that the positioning of offset cams is adjustable so the division of a time increase may be in any desired proportion from giving all to the green N & S interval to giving all to the green E & W interval. In a signal system on a traffic artery it is usually desirable to give all of the time increase to the green periods of the artery. This adjustment is simplified by removing the lobes of the cams that insert the stop period in the green indication for the cross street, and this operation is greatly facilitated by using removable lobe cams of the kind previously described.

Figure 7:
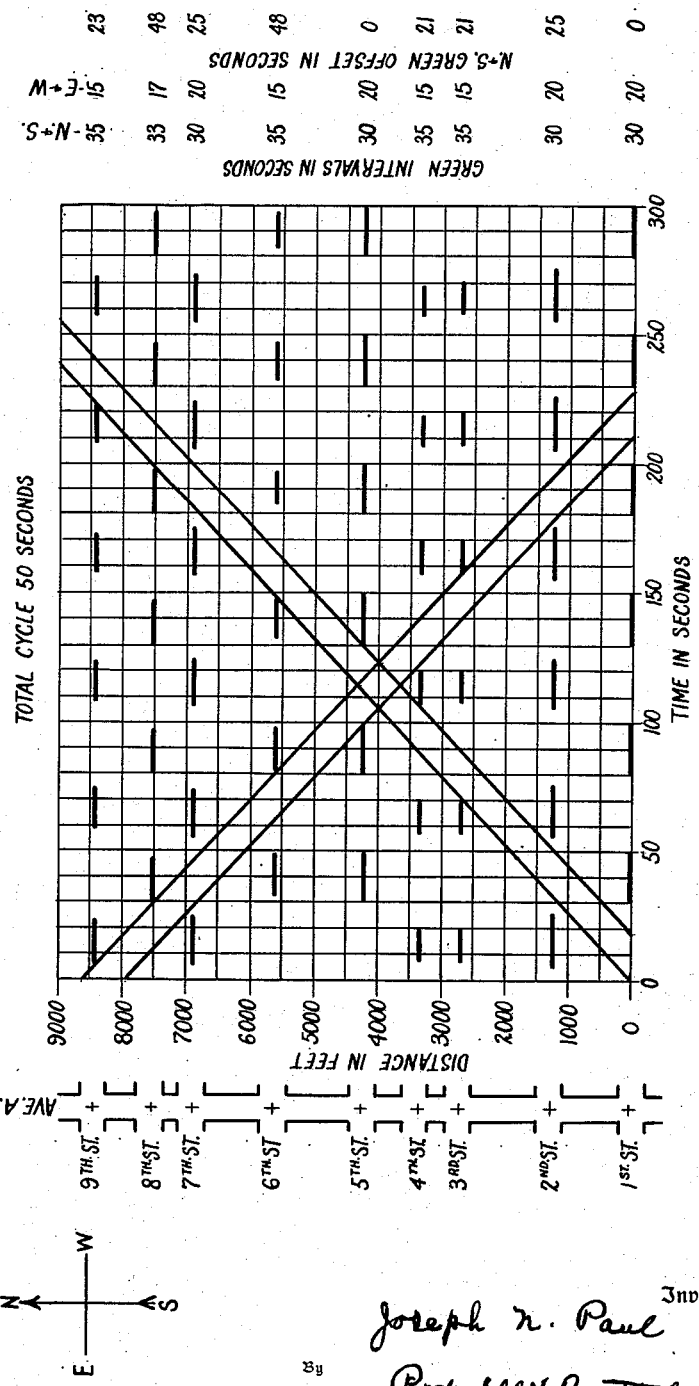

The chart shown in Fig. 7 is a traffic chart such as commonly used showing northbound and southbound traffic bands of an N & S artery, each of eighteen (18) seconds, the speed being 25 M. P. H. and the total cycle fifty (50) seconds.

Figure 8:
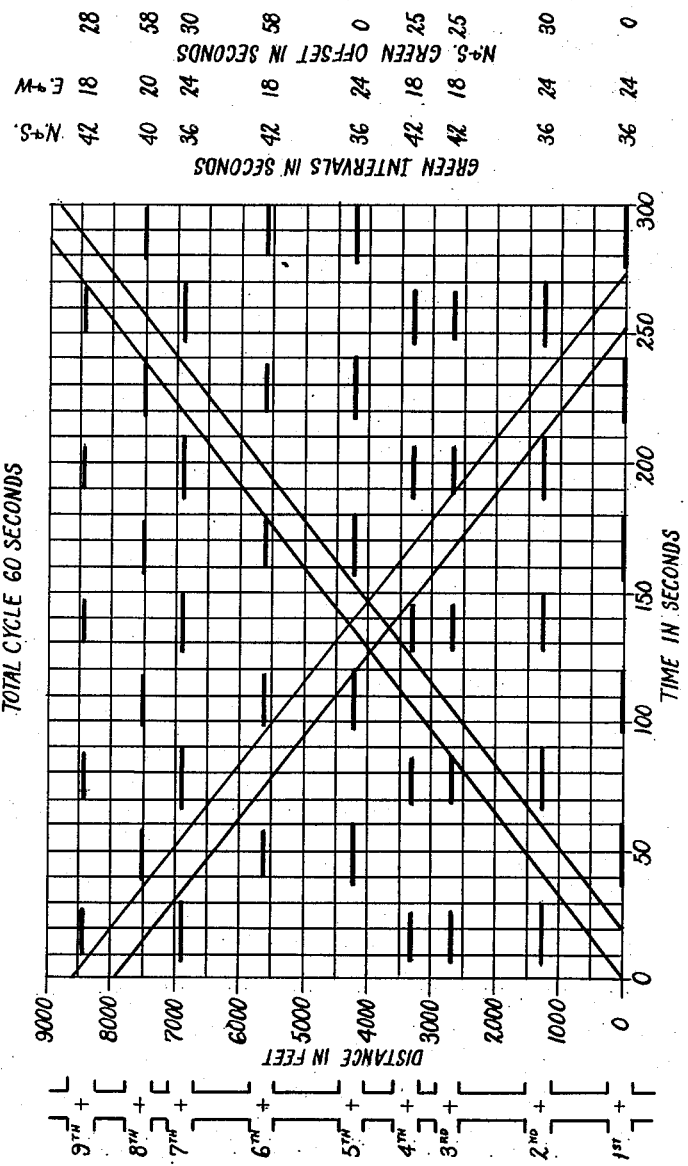

Fig. 8 is a chart showing the cycle of Fig. 7 expanded 20% by uniform percentage increase in all intervals and offsets, the northbound and southbound traffic bands each being widened to twenty (20) seconds, and the speed decreased to 20.8 M. P. H. Here the cycle is sixty (60) seconds.

Figure 9:
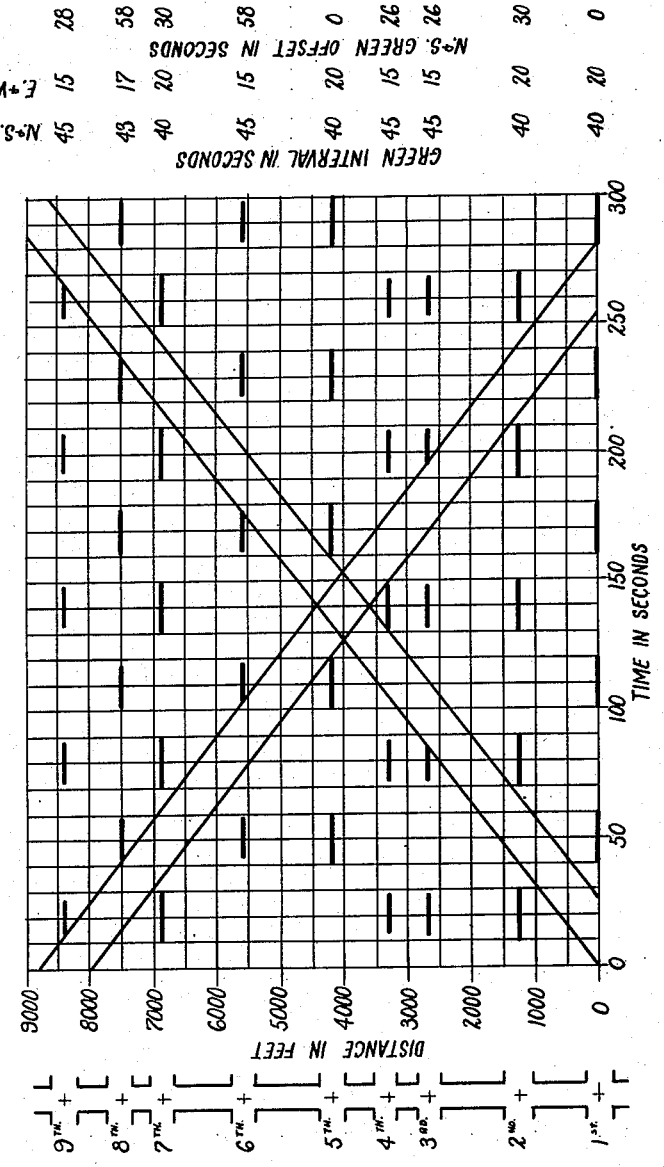

Fig. 9 shows the cycle of Fig. 7 increased 20% by adding ten (10) seconds to the north and south green intervals. Here the traffic bands are increased to twenty-five (25) seconds each, the speed is reduced to 20.8 M. P. H., and the total cycle is sixty (60) seconds. In this chart offsets less than one quarter of the base cycle remain unchanged, offsets between one quarter and three quarters of the base cycle are increased five (5) seconds, and offsets greater than three-quarters cycle are increased ten (10) seconds.

Figure 10:
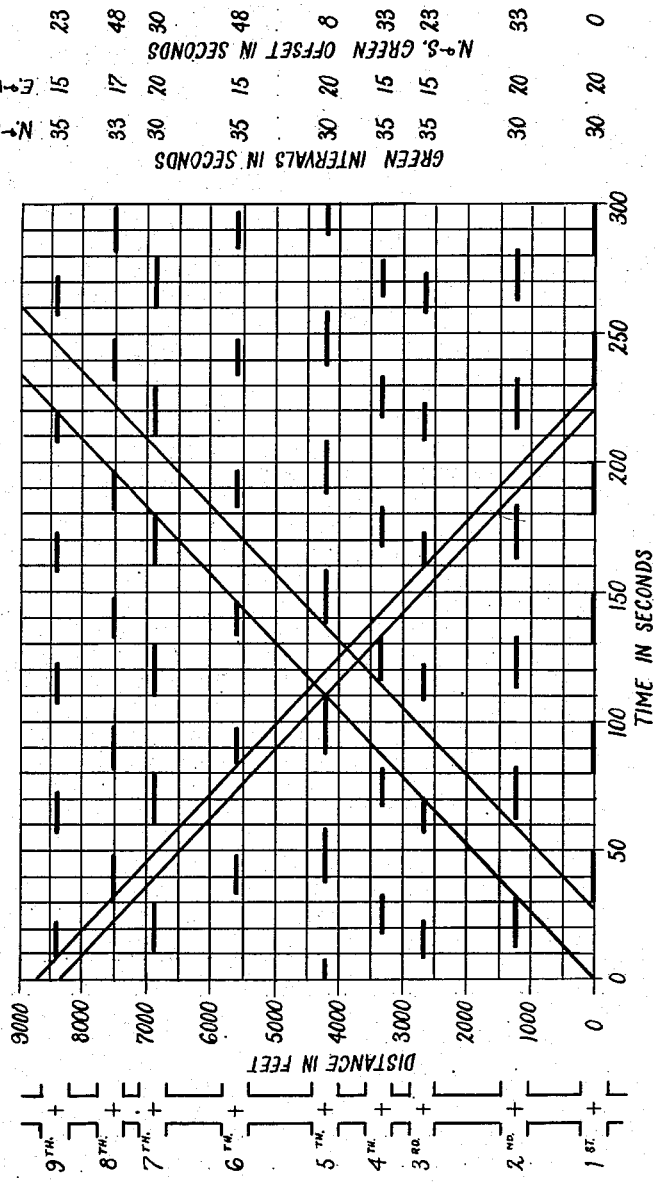

Fig. 10 shows a chart where the northbound traffic is favored, this being accomplished by change of offsets only. Here the northbound band is widened to twenty-seven (27) seconds and the southbound traffic band is decreased to ten (10) seconds, the conditions otherwise being the same as in Fig. 7.

Fig. 11 shows the cycle of Fig. 10 expanded 20% to sixty (60) seconds, all intervals and offsets being proportionately increased by 20%, the northbound band being widened from twenty-seven (27) to thirty (30) seconds, i. e. three seconds. This shows graphically the very small increase in the width of the band by distributing the cycle increase to all intervals and offsets proportionately as in prior traffic control systems commonly used. Fig. 12, however, shows graphically the band-widening effect produced by the present invention, where the cycle of Fig. 10 is expanded by 20%, the entire increase being added to the N & S green intervals. Here, as will be seen, the northbound traffic band is widened from twenty-seven (27) seconds to thirty-seven (37) seconds, which is a notable increase amounting to substantially 37%. Naturally such a large increase greatly increases the traffic capacity of a street when the need arises.

Under the condition where all time increase is added to the artery green periods, the lobe of cam 72, for example, could be removed. Switch 74 would then be made ineffective, and as the only source of energy to switch 74 is through switch 42, switch 42 and its associated cam 32 would be made ineffective. With the effectiveness of cams 72 and 32 and their associated switches and circuits removed, cam 31 and its associated switch 41 will serve to stop and release cam shaft 79 once per cycle through lead 76, switch 41, lead A', switch 73, lead 77, and brake coil 75. Cam 71, as previously explained, is positioned to stop and release cam shaft 79 once during each artery green period. Under these conditions, i. e. when cam shaft 79 is stopped and released once per cycle, cam shaft 79 is kept in step with cam shaft 28 by the release of switch 41. If the time interval between successive releases of switch 41 is increased, the time cycle of cam shaft 79 will be correspondingly increased, with the time increase all added to the artery green period.

With the effectiveness of cams 72 and 32 and their associated switches and circuits removed, as just explained, cams in any pair, such as 33 and 34, could continue to function and stop and release cam shaft 28 twice per cycle but in the case now assumed switch 41 controls the time cycle of cam shaft 79 by the time spacing of its operations. As switch 42 is not now effective, it is no longer necessary to maintain definite time relation between the functioning of switches 41 and 42, and it is no longer necessary to stop and release cam shaft 28 twice per cycle so one cam in any pair, for example cam 34 with its associated switch and circuits, can be made ineffective by removing its lobe. Removal of the lobe of cam 34 would make switch 44 ineffective, which in turn would make circuit through 55, 17, B, 56, 44, 57, 58, 59, 60 and 61 all ineffective.

All parts and circuits that are inherently ineffective or can be made so, as described, for a system in which cycle change affects artery green periods only, may be eliminated. This has the advantage of reducing costs and simplifying equipment at no sacrifice of features or functions except the facilities for apportioning time increase between two green periods. Under conditions where this feature is not needed there is no sacrifice. There is a distinct advantage in the elimination of one supervisory control line.

In the drawings, symbols for synchronous motors have been shown and timing intervals have been assumed to be exact, as provided by synchronous motors. Instantaneous starting and stopping have also been assumed. Synchronous motors providing these characteristics have many advantages, and in general are preferred, but the system nowhere depends upon exact synchronous motor timing. Induction or other types of motors that can be depended on for reasonably accurate speeds may be substituted. In the functioning of the timing adjusters and also the signal timers used in accordance with this system, the cam shafts are periodically stopped and released during each cycle. The release control is direct from the master timer, so that if there are any variations in the running of the timing-adjuster motors and signal-timer motors, these variations will be compensated for in the dwell intervals, and the start of each timing run will be correctly re-established every cycle. A reasonable amount of lag in starting time and coasting while stopping can also be compensated for in the dwell periods.

This system, using adjustable speed motors, may be supervised by a synchronous-motor master timer which will maintain exact synchronous speed for the system as a whole. If an adjustable-speed master timer is used there is provided the advantage of cycle adjustment over a continuous range.

Fig. 3 of the drawings shows a modification of the arrangement disclosed in Fig. 1, according to which a relay 123 is substituted for brake coil 27 or brake coil 75. When the relay 123 is energized, line 124 feeding the motor drive coil 125 will be broken by contact 127, and the associated motor will be stopped.

Fig. 3A shows a modification in master control circuits which can be used to save an interconnecting conductor. The lobe of cam 14 is extended to hold switch 16 closed for half a turn. This energizes line A for half a cycle and deenergizes it for the remaining half cycle. Line B is omitted. Tap 49' at the secondary controller, instead of running directly to switches as line 49 normally does, runs to a relay 157 which has a contact 158 made in the energized position and a contact 159 made in the de-energized position. When line A is energized through lead 24 and switch 16, relay 157 is energized through 49'. When relay 157 is energized, line 49 is energized by local power through lead 160, finger 161 and contact 158, and when line A is deenergized lead 56 is energized through lead 160, finger 161 and contact 159. Leads 49 and 56 are alternately energized as in the form of Fig. 1.

The advantage of saving a line conductor may in some instances far more than offset the cost of a relay at each intersection. The time periods that leads 49 and 56 are energized limit the possible extension of a green during a change of offset. In the normal system these intervals can usually be shortened to about 25% of a cycle, while in the modification of Fig. 3A they are inherently 50% of a cycle.

While in the present description the energized periods of the lines A and B take up one fourth of the signal cycle (25%), it is obvious that this is by example only, and that the duration of the energized periods may be longer or shorter.

In the present system some green or red (but never amber, pedestrian or other special period) intervals may be shortened during a change of offset under the temporary condition where cam shaft 28 does not make a normal stop, but this shortening will be limited by the gearing of the timing adjuster. Thus, in this system the lengthening or shortening of all periods during a change of offset or any other condition in the system, such as changing from manual to automatic control, can be kept within practical limits.

While only one of the improved controller units has been shown in the drawings, a number of such units are used in the system, as has been pointed out. The number of secondary controllers employed in the system is, in fact, unlimited. The control circuits A, B, 2, and 3 perform their functions by simple energized and de-energized periods which occur not oftener than once per cycle for each circuit. In such a circuit, if at any point there is an excessive voltage drop in the line, a cascade relay may be installed for picking up local full voltage, and therefore the system readily lends itself to indefinite expansion. Obviously this simplifies the system greatly as compared to systems in which variable voltages, variable frequencies, or pulsating currents are used for remote control.

It will be apparent that by this invention improved apparatus for a progressive system of traffic control is furnished which provides remote control of offset settings, cycle division or split, and cycle length. Moreover, a great increase in flexibility and ranges of adjustment is provided, and the elements of the apparatus are relatively simple, reliable and durable. Through the use of the improved apparatus the herein stated objects and the desirable operations and manipulations which give the system increased flexibility and enlarged scope in meeting the traffic conditions are achieved in an effective manner.

In the broad aspects of the invention there is no limitation to timing devices operating by electric motors. For example, so-called static timing in which timing intervals are controlled by the time required to charge or discharge a condenser may be employed. The timing can also be controlled by the time required for a gas to escape through an orifice or by changes due to heat, or the timing could be controlled by any of various mechanical or other timing means.

No claim is made herein to the structural features of the cam assembly shown in Figs. 4, 4A, 5, and 6, as this subject matter is claimed in my application, Serial No. 325,675, filed December 12, 1952.

While a preferred form of apparatus together with certain possible modifications are illustrated, this is by way of example only, and various changes in the organization of parts and in the details can be made within the principles of the invention and the scope of the claims.

What I claim is:

1. In apparatus such as described, supervisory circuit means, a master timer having means to make and break said circuit means, a pair of secondary supervisory circuits, a timing adjuster maintained in timed relation with said master timer by said supervisory circuit means, said timing adjuster having means to make and break said circuits alternately, and a signal timer maintained in timed relation with said timing adjuster by said secondary circuits.

2. In apparatus such as described, a pair of supervisory circuits, a master timer having means to make and break said circuits, a timing adjuster maintained in timed relation with said master timer by said circuits, said timing adjuster having associated therewith secondary supervisory circuit means and having means to make and break said secondary supervisory circuit means, and a signal timer maintained in timed relation with said timing adjuster by said secondary supervisory circuit means.

3. In apparatus such as described, a pair of supervisory energizing circuits, a master timer controlling the making and breaking of said circuits alternately, a secondary controller comprising a signal timer and a contactor for energizing and de-energizing a group of signal lights for governing traffic at an intersection, and a timing adjuster having timing means held and released from said master timer, and controlling supervisory energizing circuit means operably connected to said signal timer.

4. In apparatus such as described, supervisory energizing circuits, a master timer having an electric motor operated make-and-break device to make and break said circuits alternately, a contactor for operating in sequence a group of signal lights at an intersection, an electric motor operated signal timer having electric delivery connections with said contactor for operating the latter, supervisory supply circuits whereby said signal timer is operable, and a timing adjuster comprising an electric motor operated make-and-break device operable from said first supervisory circuits and having provisions for sending electric impulses alternately to said signal timer over said second supervisory circuits.

5. Apparatus as defined in claim 4 in which said timing adjuster has make-and-break means for transmitting impulses to said signal timer in offset relationship to the impulses received by it.

6. Apparatus as defined in claim 4 in which said timing adjuster is provided with selectively insertable make-and-break means for transmitting impulses to said signal timer in different relationships to each other and to the impulses sent out by the master timer.

7. In apparatus such as described, two supervisory energizing circuits, a master timer having an electric motor, a shaft geared to said motor by changeable gearing, and make-and-break means comprising cams fixed on said shaft which operate to make and break said circuits alternately, a timing adjuster comprising an electric motor operated make-and-break device operable from said first circuits and having provisions for sending electric impulses alternately over a second pair of supervisory circuits, a second pair of supervisory circuits, a signal timer operable from said second circuits and receiving alternate impulses therefrom, and a signal light contactor device operable from said signal timer.

8. In apparatus such as described, two supervisory energizing circuits, a master timer having an electric motor operated shaft-driven make-and-break device to make and break said circuits alternately, said make-and-break device making each circuit for approximately a quarter cycle and breaking it for the remainder of the cycle, an electric motor operated timing adjuster having make-and-break means similar to said first make-and-break means for making and breaking a second pair of supervisory circuits, said timing adjuster being operable from said first circuits in a variety of offsets from the master timer operation, a second pair of supervisory circuits delivering impulses from said timing adjuster, a signal timer receiving said impulses from said secondary circuits, and a light contactor operable from said signal timer.

9. Apparatus as defined in claim 8 in which said timing adjuster has shaft-driven cam-operated switches through which it is connected to the master timer for operation therefrom in a variety of offset relationships.

10. Apparatus as defined in claim 9 in which the master timer and the timing adjuster comprise gear-driven shafts of which the timing adjuster shaft is driven at a higher speed, the timing adjuster motor having means for braking it to stop the timing adjuster shaft for certain dwell periods.

11. Apparatus as defined in claim 8 in which the timing adjuster shaft is provided with one or more contact controlling cams having fixed bodies and angularly adjustable and removable lobes.

12. In apparatus such as described, a master timer controlling the making and breaking of two supervisory energizing circuits alternately, a secondary controller comprising a signal timer and a contactor for energizing and de-energizing a group of signal lights for governing traffic at an intersection, and a timing adjuster having an electric motor operated brakeable timer shaft held and released from said master timer and having make-and-break means controlling a pair of supervisory energizing circuits operatively connected to said signal timer.

13. In apparatus such as described, a master timer controlling the making and breaking of two supervisory energizing circuits alternately, a secondary controller comprising a signal timer and a contactor for energizing and de-energizing a group of signal lights for two streets at an intersection, and a timing adjuster having an electric motor operated brakeable timer shaft held and released from said master timer and having make-and-break means controlling a pair of supervisory energizing circuits operatively connected to said signal timer, said signal timer having an electric motor operated brakeable timer shaft held and released from said timing adjuster shaft and released at the ends of the energized or moving periods of the timing adjuster shaft.

14. In apparatus such as described, a pair of energizing supervisory circuits, a master timer having an electric motor operated timer shaft alternately making and breaking said circuits, each circuit being energized for a short part of a revolution of said shaft and de-energized during the remainder of the revolution, a timing adjuster having an electric motor operated brakeable timer shaft driven faster than said first shaft and alternately held and released by and from said master timer, and a signal timer having an electric motor operated brakeable timer shaft held and released from said timing adjuster shaft and having make-and-break means for energizing and de-energizing a group of signal lights governing traffic at a street intersection.

15. Apparatus as set forth in claim 14 in which said timing adjuster shaft controls make-and-break means comprising pairs of cams providing different offsets and operating in conjunction with selector relays.

16. Apparatus as set forth in claim 15 in which the cams of a pair have lobes that are individually adjustable in an angular direction.

17. In apparatus such as described, a master timer having an electric motor operated timer shaft actuating a mechanism which makes and breaks two supervisory energizing circuits alternately, a secondary controller comprising a signal timer and a contactor for energizing and de-energizing a group of signal lights at an intersection, and a timing adjuster having an electric motor operated brakeable timer shaft held and released from said master timer and having make-and-break means controlling a pair of supervisory energizing circuits operatively connected to said signal timer, the timer shaft of said master timer being driven from its motor by gearing which is changeable to change the rate of rotation of said shaft and thereby provide cycle expansion.

18. Apparatus as defined in claim 17 in which the shaft of the timing adjuster carries pairs of angularly adjustable and selectively operable cam members providing different offsets.

19. Apparatus as defined in claim 18 in which the signal lights include lights giving green, change and red indications for two streets and in which the increase in cycle expansion is apportionable between the green indications for the respective streets.

20. In apparatus such as described, two supervisory energizing circuits, a master timer having an electric motor, a shaft geared to said motor by changeable gearing, and make-and-break means comprising cams fixed on said shaft which make and break said circuits alternately, a timing adjuster comprising an electric motor operated make-and-break device operable from said first circuits and having provisions for sending electric impulses alternately over a second pair of supervisory energizing circuits in offset relationship to the impulses of said first circuits, a second pair of supervisory energizing circuits, a signal timer operable from said second circuits and receiving alternate impulses therefrom, and a signal light contactor for energizing two green, two red and two change lights at a street intersection, the total cycle of the lights being increasable by change of the master timer shaft gearing, and the timing adjuster make-and-break device including a pair of members which are individually adjustable to apportion the cycle increase between the green lights of the respective streets.

21. In apparatus such as described, a master timer controlling two supervisory energizing circuits alternately, a secondary controller comprising a signal timer and a contactor for energizing and de-energizing signal lights governing traffic at a street intersection, and a timing adjuster intermediate the master timer and the secondary controller receiving energy impulses under control from the master timer and having means for sending supervisory energizing impulses to the signal timer at a variety of offsets.

JOSEPH N. PAUL.

References Cited in the file of this patent

UNITED STATES PATENTS

| Number | Name | Date |
|---|---|---|
| Re. 21,635 | Leonard | Nov. 26, 1940 |
| 2,091,954 | Bissell | Sept. 7, 1937 |
| 2,369,588 | MacAllister | Feb. 13, 1945 |
| 2,431,159 | Bates | Nov. 18, 1947 |
| 2,444,495 | Chase | July 6, 1948 |
| 2,531,153 | Pennell | Nov. 21, 1950 |